United States Patent [19]
Sakata et al.

[11] Patent Number: 4,551,919
[45] Date of Patent: Nov. 12, 1985

[54] MEASURING INSTRUMENT

[75] Inventors: Hideo Sakata; Yukiji Yoda, both of Kawasaki, Japan

[73] Assignee: Mitutoyo Mfg. Co., Ltd., Tokyo, Japan

[21] Appl. No.: 539,361

[22] Filed: Oct. 6, 1983

[30] Foreign Application Priority Data

Oct. 27, 1982 [JP] Japan ................. 57-188750
Oct. 27, 1982 [JP] Japan ................. 57-188751

[51] Int. Cl.⁴ .............................. G01B 7/03
[52] U.S. Cl. ............................. 33/1 M; 33/503
[58] Field of Search ........... 33/125 R, 125 A, 125 C, 33/1 M, 174 L, 169 R, 170, 143 M, 147 N; 308/3.5

[56] References Cited

U.S. PATENT DOCUMENTS

| | | | |
|---|---|---|---|
| 2,418,639 | 4/1947 | Horman | 308/3.5 X |
| 3,108,381 | 10/1963 | Kuebler | 33/445 X |
| 3,373,497 | 3/1968 | Lewis | 33/170 |
| 3,624,910 | 12/1971 | Farrand | 33/1 M |
| 3,742,609 | 7/1973 | Jeannet et al. | 33/143 M |
| 3,749,501 | 7/1973 | Wieg | 33/1 M X |
| 4,013,280 | 3/1977 | Chitayat | 33/1 M X |
| 4,295,742 | 10/1981 | Nelle et al. | 33/125 C X |

FOREIGN PATENT DOCUMENTS 49743 4/1982 European Pat. Off. .......... 33/125 C

Primary Examiner—Harry N. Haroian
Attorney, Agent, or Firm—Flynn, Thiel, Boutell & Tanis

[57] ABSTRACT

This invention relates to measuring instruments such as a three-dimensional measuring instrument having a device for protecting the surface of a scale provided on a guide rail for moving a measuring element support member.

A scale (7) secured to one side surface of one of guide rails provided at opposite side surfaces of a bedplate (1), on which a work (18) to be measured is rested, is covered by a pair of a constant load spring. These constant load springs (8) and (8) are solidly secured at the ends at one side to shock absorbers (20) and (20) provided at the end portions of the guide rail (4) and connected at the ends at the other side to a pair of retractors (27) and (27) provided in a support (10) of a measuring element support member (9), and the constant load springs (8) and (8) can be suitably extended or wound by following movements of the measuring element support member (9), so that adhesion of oil to the surface of the scale (7) and the like can be effectively prevented, thus enabling to secure the stable measuring accuracy.

13 Claims, 6 Drawing Figures

MEASURING INSTRUMENT

BACKGROUND OF THE INVENTION

1. Field of the Invention

This invention relates to measuring instruments wherein a measuring element support member is made movable on guide rails, such as a two-dimensional measuring instrument, three-dimensional measuring instrument and contour measuring instrument, and more particularly to a scale protection device affixed to the guide rail.

2. Description of the Prior Art

In general, in the measuring instrument of the type described, in order to measure the displacement value of the measuring element support member with high accuracies, it is necessary to use scales finished with high accuracies, such as a glass scale, magnetic scale, reflecting type metallic plate scale and the like. Further, in order to maintain this high extent of accuracy, it is necessary to protect the outer surface of the scale. More particularly, if there occur adhesion of oil through contact by operators, accumulation of iron scraps, dust and the like and damages caused by abutted tools and the like, a desirable measuring accuracy cannot be attained.

In view of the above, in the measuring instruments of the prior art, protection devices have been provided for the surface of the scales. However, the measuring instruments of the prior art have presented such disadvantages that the measuring accuracy is lowered, difficulties are felt in assembling and disassembling and so forth due to increased sliding resistance. For example, according to Japanese Utility Model Applications Publication Nos. 32506/1964 and 35765/1981, there is described such a construction that a single belt-like member is stretchingly provided in the longitudinal direction of a rack or a scale, this belt-like member extending through a slidable bed or a slider, movable relative to a scale or the like, and this belt-like member is closely attached to the surface of a scale containing case or the surface of a scale under tension during stretching. However, since, in these well known constructions, the belt-like member is used integrally with the case or scale, it is necessary to increase the tension in order to strengthen the attaching force. The increased attaching force increases the sliding resistance of the slider excessively, and has contributed to the occurrence of errors in returning at the time of reversing the moving direction. Furthermore, the thickness of the slider and the like in a direction perpendicular to the plate thickness of the belt-like member has been increased, whereby the device has been rendered large sized and the construction has been complicated, thus presenting the disadvantages that difficulties are felt not only in assembling and disassembling but also in inspecting the scale. Further, there have been raised problems that there are possibilities of a gap occurring between the belt-like member and the case due to expansion or shrinkage caused by a temperature change in the belt-like member, separation caused by vibrations and the like which effects looseness of the belt-like member and a hindering of the slider in its movement.

SUMMARY OF THE INVENTION

The present invention has as its object the provision of a measuring instrument capable of effectively protecting the scale, minimizing the sliding resistance of the measuring element support member (slider) supporting the measuring element and facilitating the assembling and disassembling.

To this end, the present invention contemplates that a measuring element support member is reciprocatingly provided on guide rails having a scale, retractors are provided at opposite ends of this measuring element support member in the longitudinal direction of the scale, respectively, scale protection devices each formed of a belt-like member and secured at one end to the guide rail and wound at the other end by the retractor are provided at opposite ends of the measuring element support member, respectively, whereby, during movement of the measuring element support member, one of the belt-like members is extended along the scale to protect the scale and the other is wound by the retractor to be out of the way of the measuring element support member to thereby decrease the sliding resistance, and further, the belt-like members not penetrating through the measuring element support member can facilitate the assembling and disassembling.

DETAILED DESCRIPTION OF THE PREFERRED EMBODIMENT

Description will hereunder be given of one embodiment, in which the present invention is applied to a three-dimensional measuring instrument, with reference to the drawings.

Figure 1:
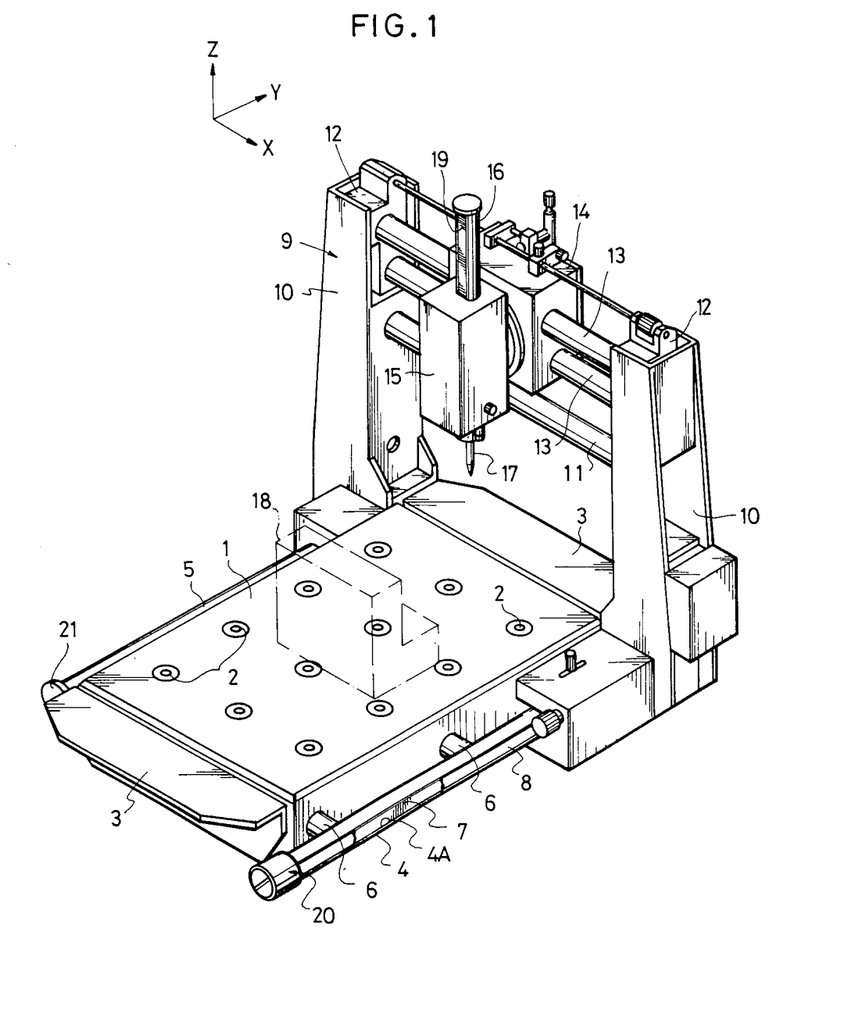
FIG. 1 is a partially cut-away perspective view showing one embodiment in which the present invention is applied to a three-dimensional measuring instrument.
Figure 2:
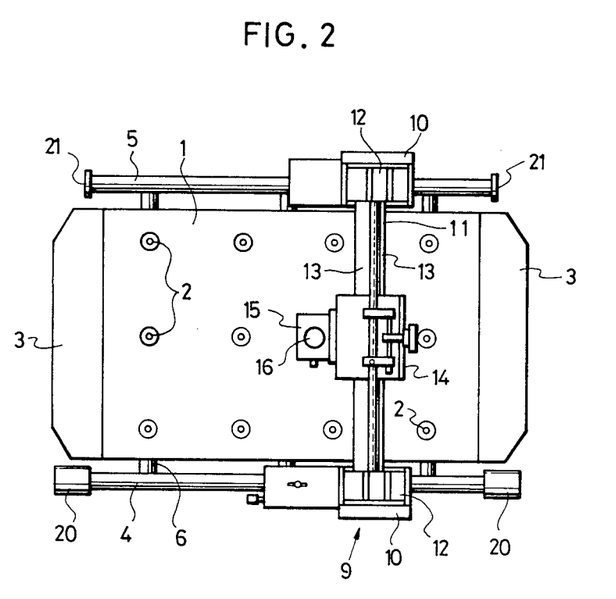
FIG. 2 is a plan view thereof.

In the general arrangement shown in FIGS. 1 and 2, a bedplate 1 formed of a stone surface plate is provided on the upper surface thereof with a plurality of threaded holes 2 for facilitating the mounting of work to be measured and further provided at the front and rear end faces perpendicularly intersecting the longitudinal direction thereof with handgrips 3 L-shape in cross section, respectively. This bedplate 1 is provided at opposite side surfaces thereof with guide rails 4 and 5, respectively, secured thereto by a plurality of stems 6. These guide rails 4 and 5 are longer than the length in the longitudinal direction (direction of the Y axis) of the bedplate 1, are disposed below the upper surface of the bedplate 1 and are parallel therewith, and project from the side surfaces of the bedplate 1. Furthermore, both the guide rails 4 and 5 are each formed such that opposite and laterally facing sides of a column are machined parallel to each other and the shape of a cross-section of the column perpendicularly intersecting the longitudinal direction of the column is formed into substantially an oval shape consisting of circularly arcuate portions and rectilinear portions (Refer to FIG. 3). Further, one of the guide rails, i.e., the guide rail 4 shown in front in FIG. 1 has adhesively attached at the outer side surface thereof a long scale 7 formed thereon with a vertical fringe graduation of $\mu$m order in a groove 4A formed in the longitudinal direction of the guide rail 4. The scale surface extends vertically (Refer to FIGS. 3 and 4). The surface of this scale 7 is protected by a scale protection device 8 to be described later.

A measuring element support member 9 is supported by both of the guide rails 4 and 5 in a manner to be able to reciprocate in the longitudinal direction (direction of the Y axis) of the guide rails 4 and 5. This measuring element support member 9 includes a pair of supports 10, a dimension control shaft 11 fixedly secured to and extending between these supports 10, a pair of X shafts 13 secured to and extending between position adjusting blocks oriented at the top portions of the supports 10, an X slider 14 slidably supported on the pair of X shafts 13, a spindle support member 15 tiltably mounted on this X slider 14, and a spindle (Z slider) 16 supported on this spindle support member 15 in a manner to be slidable in a direction of the Z axis. A measuring element 17 is detachably supported on the bottom end of the spindle 16 of this measuring element support member 9. Three-dimensional displacement values of this measuring element 17 with respect to the work 18 to be measured are detected as a displacement value in the direction of the Y axis between the scale 7 and a displacement detector 33 (Refer to FIG. 4) incorporated in the bottom portion of the support, which will be described hereunder, as a displacement value in the direction of the X axis between a scale, not shown, provided on the X shaft 13 and a displacement detector, not shown, provided in the X slider 14, and as a displacement value in the direction of the Z axis between a scale 19 provided in the spindle 16 and a displacement detector, not shown, provided in the spindle support member 15.

Shock absorbers 20 are secured to opposite ends of one of the guide rails 4, respectively, and the other of the guide rails 5 has secured to opposite ends thereof stoppers 21 having a diameter larger than the guide rail 5, respectively. These shock absorbers 20 and stoppers 21 prevent the measuring element support member 9 from falling off the guide rails 4 and 5.

Figure 3:
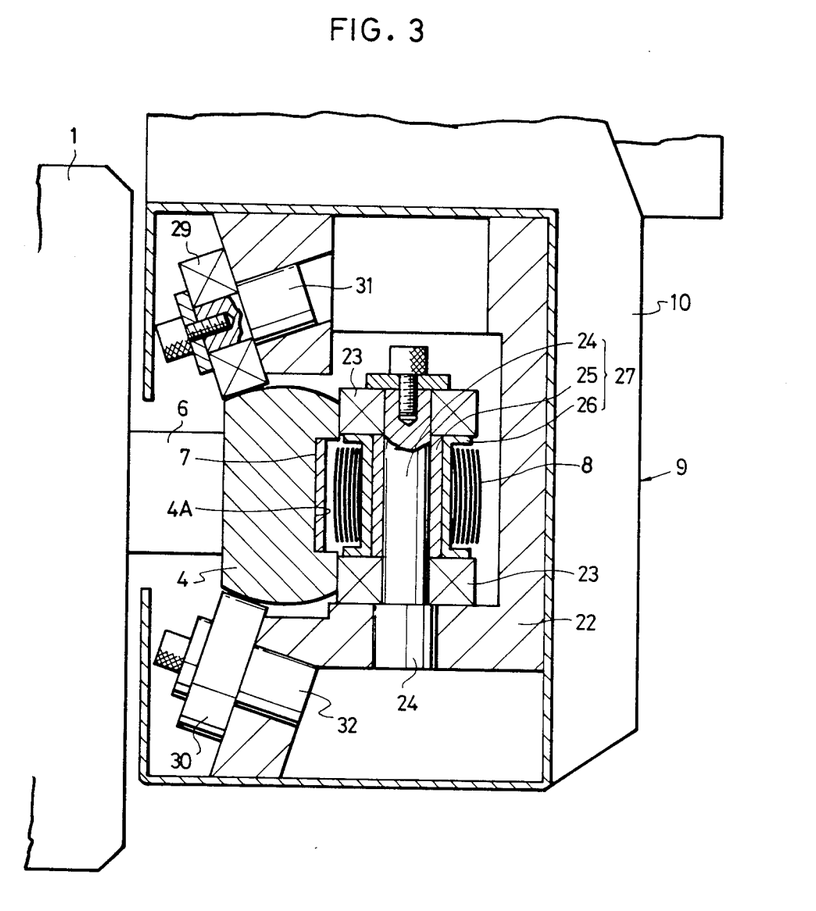
FIG. 3 is an enlarged sectional view taken along the line III—III in FIG. 4, showing the general arrangement in a support block of the present embodiment.
Figure 4:
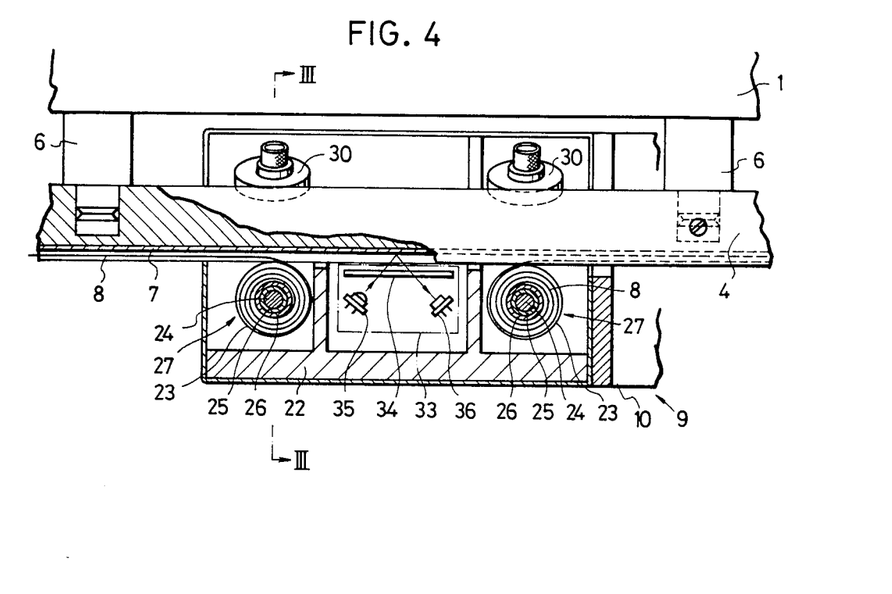
FIG. 4 is a cross-sectional view showing the general arrangement in the support block.

FIGS. 3 and 4 detailedly show the construction of the engagement between the support 10 and the guide rail 4 in the bottom portion of the support 10 of the measuring element support member 9. Referring to these drawings, a support block 22 is provided at the bottom portion of the support 10. On this support block 22 through a support shaft 24, there are rotatably supported a pair of rollers 23 arranged in the vertical direction, which are rotatable in contact with the outer side surface of the guide rail 4, i.e., the planer portion on the side where the scale 7 is adhesively attached. A spacer 25 being a first cylindrical member, is interposed between the pair of rollers 23 on the outer periphery of this support shaft 24. A spool-shaped collar 26 made of a low friction material such as fluorine plastics, being a second cylindrical member, is coupled onto the outer periphery of this spacer 25. The dimension between both rollers 23 is maintained due to the presence of this spacer 25, and smooth rotation of the rollers 23 is assured by the spool-shaped collar 26. In this case, the support shaft 24, spacer 25 and collar 26 constitute a retractor 27. Retractably mounted on the outer periphery of the collar 26 of this retractor 27 is one end of the scale protection device 8, the other end of which is secured to the shock absorber 20. This protection device 8 consists of a belt-like member formed of a constant load spring wound into a spiral shape. Here, an inner diameter portion of the constant load spring constituting the protection device 8 in a free condition is designed to be smaller than the outer diameter of a constant load spring retracting portion of the collar 26, so that automatic winding can be effected by virtue of the characteristics of the constant load spring.

Rotatably supported on the support block 22 through support shafts 31 and 32 are two vertically arranged rollers 29 and 30 rotatable in contact with the upper and lower cylindrical surfaces of the guide rail 4. The guide rail 4 is clamped from the directions of 120° by these rollers 29, 30 and the pair of rollers 23, so that the support block 22, i.e., the measuring element support member 9 is smoothly slidable on the guide rail 4. Furthermore, the group of rollers including these rollers 29, 30 and 23 are arranged such that one pair of rollers are provided on opposite sides of the support block 22, i.e., the measuring element support member 9 along the longitudinal direction of the guide rail 4. In this case, the "opposite sides" need not necessarily be "opposite ends". In the case of FIG. 4, the pair of rollers on the right side are drawn at positions relatively close to the center of the support 10, however, this pair of rollers may be provided at positions close to the extreme right, not shown. In short, at least two pairs of rollers should be provided for the support block 22. Furthermore, as for the group of rollers to the right in FIG. 4, the spacer 25, being the first cylindrical member, and the spool-shaped collar 26, being the second cylindrical member, are coupled to the support shaft 24 of the pair of rollers 23 vertically arranged in the same manner as described above. These support shafts 24, spacer 25 and collar 26 constitute a retractor 27 similarly to the above. After all, two retractors 27 are provided on the support block 22 along the longitudinal direction of the guide rail, and the retractor 27 on the right side is adapted to retract one end of the scale protection device 8 consisting of the belt-like constant load spring, the other end of which is affixed to the shock absorber 20 to the right side in FIG. 2. In consequence, the ends on one side of both scale protection devices 8, the ends on the other side are retracted by both retractors 27, are extended to the right and left along the surface of the scale 7 adhesively attached to the guide rail 4, respectively, to thereby protect the scale 7. Along with the measuring element support member 9 on the guide rail 4, one of the constant load springs is extended, while, the other is retracted by the retractor 27. Further, the constant load springs constituting both of the scale protecting devices 8 have the resilient characteristics substantially equal to each other, so that the measuring element support member 9 can move either to the right or left under the substantially equal force.

As shown in the general arrangement shown in FIG. 4, the support block 22 is provided thereon with a displacement detecting unit 33, which constitutes in cooperation with the scale 7 a Y direction displacement detecting device for measuring a displacement value of the measuring element support member 9 in the direction of the Y axis. This detecting unit 33 includes an index scale 34, wherein a graduation similar to that as in the scale 7 is formed on a transparent sheet made of glass or the like, a light emitting element 35 for sending a light to the surface of the scale 7 through the index scale 34, and a light receiving element 36 for receiving the light emitted from the light emitting element 35.

The detecting unit 33 can measure a displacement value of the support member 9 in the direction of the Y axis through a sinusoidal wave-shaped current generated in the light receiving element 36 through a change in the value of the received light by brightness or darkness of the both graduations due to a relative movement between the both scales 7 and 34. In this case, the optical axes of the light emitting element 35 and the light receiving element 36 are arranged in a V-shape, whereby the light emitted from the light emitting element 35 is reflected at the scale 7 and reliably reaches the light receiving element 36.

Figure 5:
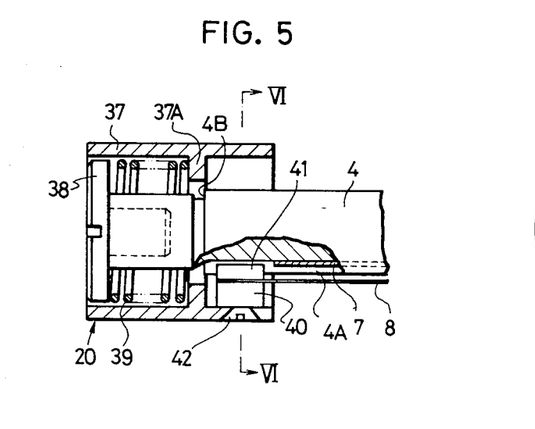
FIG. 5 is an enlarged sectional view showing the interior of a shock absorber of the present embodiment.
Figure 6:
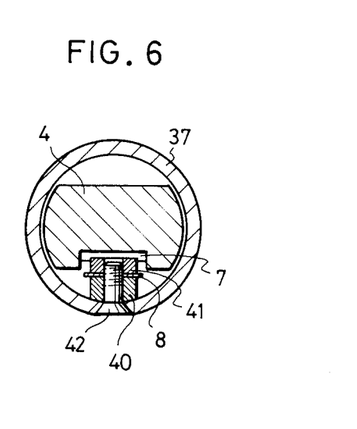
FIG. 6 is a sectional view taken along the line VI—VI in FIG. 5.

FIGS. 5 and 6 detailedly show the construction of the shock absorber 20. Referring to these drawings, the shock absorber 20 is of such an arrangement as will be described hereunder. Namely, the shock absorber 20 includes a substantially cylindrical movable element 37 slidably engaged with an end portion of the guide rail 4 and having an inner peripheral ridge 37A capable of abutting against an end face 4B of a stepped portion formed at the end of the guide rail 4, a spring receiver 38 threadably coupled into the end portion of the guide rail 4 and having the outer periphery come into substantially sliding contact with the inner periphery of the movable element 37, and a compression spring 39 confined between this spring receiver 38 and the inner peripheral ridge 37A of the movable element 37, for constantly biasing the movable element 37 to be abutted against the end face 4B of the stepped portion. When the measuring element support member 9 abuts against the movable element 37, the spring 39 is deflected, so that an impact received by the support member 9 can be reduced.

One end portion of the scale protection device 8 consisting of the constant load spring is clamped between a bush 40 and a nut 41 and affixed to the movable element 37 of the shock absorber 20 through a bolt 42.

Additionally, engagement of the guide rail 5 with the measuring element support block 22, as shown to the left in the rear of FIG. 1, is effected by a plurality of pairs of rollers, not shown, including a pair of rollers brought into abutting contact with the upper and lower cylindrical surfaces of the guide rail 5 from the directions of 180°, so that the support member 9 as a whole can smoothly move in the direction of the Y axis.

When the shape and the like of a work 18 are measured by use of the present embodiment with the above-described arrangement, in the same manner as with the ordinary three-dimensional measuring instrument of the prior art, the bottom end of the spindle 16 is gripped and the measuring element 17 is successively brought into contact with predetermined portions of the work 18, and displacement values of the measuring element 17 in the directions of the X, Y and Z axes are detected by the displacement detecting unit 33 or the like. In this case, the scale 7 should be covered by the protection devices 8 at all times, and spoiling by oil and the like, or damages, etc., through the abutment of the tools and the like should be effectively avoided.

The present embodiment with the abovedescribed arrangement can offer the following advantages. More specifically, as the protection device 8, the belt-like constant load spring, one end portion of which is wound into a spiral shape, is used, and two of the protection devices 8 are stretched across the opposite ends of the guide rail 4 having the scale 7 and the opposite sides of the measuring element support member 9, respectively, so that the scale 7 can be satisfactorily protected, while the smooth sliding of the measuring element support member 9 is assured. Furthermore, the both protecting devices 8 are constructed to have the characteristics substantially equal to each other, so that the support member 9 can move in any direction under a substantially uniform force, and further, a constant load may be applied to a support member driving device in the case of automation, thus enabling to adopt automation advantageously. Further, the protection devices 8 are provided separately of each other at positions to the right and left, whereby necessity of causing the displacement detecting unit 33 to make a detour as in the prior art is eliminated, so that the inner construction can be simplified, thereby enabling to facilitate the assembling and disassembling. Furthermore, the retractor 27 utilizes in its construction the support shaft 24 of the roller 23 for engaging the guide rail 4 with the support member 9, so that the construction can be simplified, rendered compact, and the space from the surface of the scale can be secured.

Furthermore, the retractor 27 is provided thereon with the spool-shaped collar 26 as being the second cylindrical member, whereby, if the outer diameter of the winding portion of this collar 26 is suitably determined, then a suitable space can be set between the protection device 8 consisting of the constant load spring and the surface of the scale. Further, the constant load spring may be prevented from abutting against the upper and lower rollers 23 due to the presence of flange portions of the spool of this collar 26, so that generation of noises and unsatisfactory rotating condition can be effectively avoided. Additionally, the collar 26 is made of low friction material, so that the collar 26 and the spacer 25 can be smoothly rotated at all times. In consequence, even if the constant load spring is increased in its finding force, the support member 9 can avoid being hampered in its movement due to the winding of the spring.

Further, an end or free end of the constant load spring is mounted to the movable element 37 of the shock absorber 20, so that the movable element 37 can be locked in its rotation, with the shock absorber not being impaired in its shock absorbing function. In assembling or disassembling the support member 9, removal, etc., of the scale 7, which has been set with high accuracies, are not required, so that it is convenient. The movable element 37 is mounted to one end of the constant load spring, whereby the open end of the constant load spring is not completely wound into the retractor 27 during disassembling, so that the disassembling works can be smoothly conducted.

Furthermore, the constant load spring constituting the scale protection device 8 is secured at the free end to the scale 7 and at the winding end to the detecting unit 33, whereby the support shaft 24 of the rollers 23 can be utilized as described above, so that necessity of providing a special shaft for the retractor 27 is eliminated, and moreover, the surface of the scale can avoid being damaged by breakage or bending of the constant load spring, caused to the fixing portion of the free end. More specifically, in contrast to the above embodiment, when the free end is affixed to the side of the detecting unit 33, a bent portion formed at this fixed portion moves relative to the scale 7 at all times, thereby possibly damaging the surface of the scale.

Further, the automatically winding diameter on the side of winding (diameter of winding at the initial stage) of the constant load spring is made smaller than the outer diameter of the winding portion of the spool-shaped collar 26, so that looseness of the constant load spring due to slackened winding can be avoided to thereby maintain the straightness, the scale 7 and the like can be effectively protected from damages, and a smooth draw-out can be secured.

Furthermore, the scale 7 is secured to the guide rail 4 with the scale surface extending vertically, and the constant load spring being parallel thereto, so that the constant load spring can be effectively prevented from contacting the scale surface due to looseness of the constant load spring, and further, from damaging the scale surface due to such contacts, as different from the case where the scale surface is provided in the horizontal direction, facing upwardly.

Additionally, in working, the scale protection device 8 need not necessarily be limited to the constant load spring of spiral shape, but a mere belt-like member having no resiliency may be adopted. However, in this case, it is necessary to provide a spring or the like having a winding force on the retractor 27. Therefore, the arrangement in the present embodiment is more advantageous than the above. Furthermore, the retractor 27 need not necessarily utilize the support shaft 24 of the rollers 23, however, the utilization results in the above-described advantage. Further, as for the spacer 25 and the collar 26, if it does not matter to have slight sliding noises and unsatisfactory moving condition, then either the spacer 25 or the collar 26, or the both member may be dispensed with. Furthermore, such an arrangement may be adopted that the constant load springs are not uniformly provided, the both springs are different in strength from each other, and the measuring element support member 9 is always returned to either one of the opposite sides of the guide rail 4 in free conditions. Further, the scale 7 need not necessarily be limited to the optical reflection type scale, but, a light transmitting type scale, electromagnetic scale, magnetic scale, electrostatic capacity type scale, or contact point scale may be adopted. Needless to say, along with the adoption of any one of such scales, the detecting unit 33 should be changed into the one suitable for the adopted scale. Furthermore, in the above embodiment, description has been given of the case where the present invention is applied to the three-dimensional measuring instrument, however, the present invention need not necessarily be limited to this, but, may be applied to not only the large-size measuring instruments such as a two-dimensional measuring instrument and contour measuring instrument, but also small-size measuring instruments such as a caliper, height gauge and dial gauge, further, to an independent measuring machine for measuring rectilinear movement such as a linear scale (trade name), and moreover, to slidable portions of machine tools. In short, the present invention is applicable to measuring instruments and other machines for measuring a displacement value between two bodies relatively movable in the straight line.

Additionally, in the form of application, the guide rail 4 may be fixed or movable. In short, any guide rail 4, which may be movable relative to the measuring element support member 9, is adoptable.

As has been described hereinabove, the present invention is advantageous in providing a measuring instrument capable of effectively protecting the scale, allowing the measuring element support member to slide smoothly, and facilitating the assembling and disassembling.

The embodiments of the invention in which an exclusive property or privilege is claimed are defined as follows:

1. A measuring instrument, comprising:
    a measuring element support member supporting a measuring element and being reciprocatingly mounted on a guide rail;
    a scale affixed onto said guide rail in the longitudinal direction thereof;
    a displacement detection unit secured to said measuring element support member, for detecting a displacement value of said measuring element support member relative to said scale; and
    scale protection devices provided on opposite sides of said measuring element support member in the longitudinal direction of said scale, respectively, each of which is formed of a belt-like member, one end of which is secured to an end portion of said guide rail and the other end of which wound onto a retractor provided on said measuring element support member, said retractor comprising a support shaft for at least one roller allowing said measuring element support member to move back and forth on said guide rail, and a cylindrical surfaces thereon and along the length thereof, one of said planar side surfaces being disposed on the outer side with respect to said bedplate and has a groove along the length thereof;
    an elongated scale secured in said groove and being vertically oriented;
    a measuring element support member including a pair of supports movably mounted on said guide rails by rollers and a spindle support member movably provided on shafts extending between said two supports;
    a displacement detecting unit provided in one of said supports on the side of said guide rail having said scale, for detecting a displacement value of said measuring element support member relative to said scale; and
    a pair of spiral constant load springs fixedly secured at the ends on one side of said measuring element support member to shock absorbers provided at opposite end portions of said guide rail having the scale, and wound at the other ends onto a retractor having a cylindrical member rotatably provided in said support member, and disposed in parallel relation to a surface on said scale thereby covering the same.

2. A measuring instruments as set forth in claim 1, wherein said belt-like members are each formed of a spiral constant load spring.

3. A measuring instrument as set forth in claim 2, wherein said constant load springs have characteristics substantially equal to each other.

4. A measuring instrument as set forth in claim 2, wherein said constant load spring is secured at one end thereof to a movable element provided at an end portion of said guide rail, and said movable element is movable within a predetermined range in the axial direction of said guide rail.

5. A measuring instrument as set forth in claim 1, wherein said belt-like member is a constant load spring, one end of which is wound around said cylindrical member rotatably supported on said support shaft, and is capable of automatically winding thereonto due to the winding characteristics of said constant load spring.

6. A measuring instrument as set forth in claim 1, wherein an inner diameter portion of said constant load spring in a free condition is made smaller than the outer diameter of said cylindrical member.

7. A measuring instrument as set forth in claim 1, wherein the surface of said scale extends vertically and said belt-like members are in parallel relation to the scale surface thereby covering the same.

8. A measuring instrument, comprising:
   a bedplate;
   guide rails affixed to said bedplate along opposite sides thereof and extend in the longitudinal direction thereof, onto which work to be measured is placed, said guide rails each having oppositely facing planar side surfaces thereon and along the length thereof, one of said planar side surfaces being disposed on the outer side with respect to said bedplate and has a groove along the length thereof;
   an elongated scale secured in said groove and being vertically oriented;
   a measuring element support member including a pair of supports movably mounted on said guide rails by rollers and a spindle support member movably provided on shafts extending between said two supports;
   a displacement detecting unit provided in one of said supports on the side of said guide rails having said scale, for detecting a displacement value of said measuring element support member relative to said scale; and
   a pair of spiral constant load springs fixedly secured at the ends on one side of said measuring element support member to shock absorbers provided at opposite end portions of said guide rail having the scale, and wound at the other ends onto a retractor having a cylindrical member rotatably provided in said support member, and disposed in parallel relation to a surface on said scale thereby covering the same.

9. A measuring instrument as set forth in claim 9, wherein an inner diameter portion of said constant load spring in a free condition is made smaller than the outer diameter of said cylindrical member.

10. A measuring instrument as set forth in claim 9, wherein said constant load spring is capable of automatically winding onto said retractor due to the winding characteristics of said constant load spring.

11. A measuring instrument as set forth in claim 10, wherein said retractor comprises a support shaft for said rollers, said cylindrical member being mounted onto said support shaft, one end of said constant load spring being attached to said cylindrical member and windable thereonto.

12. A measuring instrument as set forth in claim 8, wherein said shock absorber comprises a substantially cylindrical movable element engageably, loosely coupled onto a portion of said guide rail and a spring confined between said movable element and said guide rail.

13. A measuring element as set forth in claim 12, wherein one end of said constant load spring is affixed to said movable element.

* * * * *

UNITED STATES PATENT AND TRADEMARK OFFICE
CERTIFICATE OF CORRECTION

PATENT NO. : 4 551 919
DATED : November 12, 1985
INVENTOR(S) : Hideo SAKATA et al It is certified that error appears in the above-identified patent and that said Letters Patent is hereby corrected as shown below:

Column 8, claim 1, lines 4 - 50 should read:

---1. A measuring instrument, comprising:

a measuring element support member supporting a measuring element and being reciprocatingly mounted on a guide rail;

a scale affixed onto said guide rail in the longitudinal direction thereof;

a displacement detection unit secured to said measuring element support member, for detecting a displacement value of said measuring element support member relative to said scale; and scale protection devices provided on opposite sides of said measuring element support member in the longitudinal direction of said scale, respectively, each of which is formed of a belt-like member, one end of which is secured to an end portion of said guide rail and the other end of which wound onto a

UNITED STATES PATENT AND TRADEMARK OFFICE
CERTIFICATE OF CORRECTION

PATENT NO. : 4 551 919
DATED : November 12, 1985
INVENTOR(S) : Hideo SAKATA et al It is certified that error appears in the above-identified patent and that said Letters Patent is hereby corrected as shown below:

retractor provided on said measuring element support member, said retractor comprising a support shaft for at least one roller allowing said measuring element support member to move back and forth on said guide rail, and a cylindrical member rotatably mounted on said support shaft, said cylindrical member being formed into a double wall cylinder, including a cylindrical spacer mounted onto said support shaft and a collar rotatably mounted onto said spacer.---
Column  8, line 51; change "instruments" to ---instrument---.
Column 10, line  9; change "9" to ---8---.
Column 10, line 14; change "9" to ---8---.

Signed and Sealed this

Twenty-ninth Day of July 1986

[SEAL]

Attest:

DONALD J. QUIGG

Attesting Officer

Commissioner of Patents and Trademarks